US006407891B1

(12) United States Patent
Chang et al.

(10) Patent No.: US 6,407,891 B1
(45) Date of Patent: Jun. 18, 2002

(54) MAGNETIC READ/WRITE HEAD HAVING ELECTROMAGNETIC FIELD CANCELLATION ELEMENT

(75) Inventors: Thomas Young Chang, San Jose; Shanlin Duan, Fremont; Terence Tin-Lok Lam; Wai C. Leung, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/317,808

(22) Filed: May 24, 1999

(51) Int. Cl.[7] ............................. G11B 5/39; G11B 5/31
(52) U.S. Cl. ........................................ 360/317; 360/319
(58) Field of Search ............................... 360/123, 124, 360/125, 126, 128, 317, 318, 319

(56) References Cited

U.S. PATENT DOCUMENTS

| 3,740,736 A | | 6/1973 | Dion et al. | |
|---|---|---|---|---|
| 4,130,847 A | | 12/1978 | Head et al. | |
| 4,255,772 A | | 3/1981 | Perez et al. | |
| 4,881,143 A | * | 11/1989 | Bhattacharyya et al. | .... 360/125 |
| 5,486,967 A | | 1/1996 | Tanaka et al. | |
| 5,583,726 A | * | 12/1996 | Mizoshita et al. | .......... 360/319 |
| 5,875,080 A | * | 2/1999 | Seagle | ......................... 360/123 |

FOREIGN PATENT DOCUMENTS

| JP | 55-64622 A | | 5/1980 |
|---|---|---|---|
| JP | 57-105814 | | 7/1982 |
| JP | 58-114321 A | | 7/1983 |
| JP | 359151334 A | | 8/1984 |
| JP | 63-138514 A | | 6/1988 |
| JP | 1-298507 A | | 12/1989 |
| JP | 04-216311 | | 8/1992 |
| JP | 05-225526 | * | 9/1993 |
| JP | 06-150260 | * | 5/1994 |
| JP | 06-295418 | | 10/1994 |
| JP | 11-31305 | * | 2/1999 |

OTHER PUBLICATIONS

IEEE Transactions on Magnetics, vol. 25, No. 5, Chapman, Sep. 1989, pp. 3686–3688.

* cited by examiner

Primary Examiner—David L. Ometz
(74) Attorney, Agent, or Firm—Robert O. Guillot; Oppenheimer Wolff & Donnelly LLP

(57) ABSTRACT

The present invention is a read/write head for writing information to magnetic media and reading information from magnetic media. It includes a write head for writing information onto magnetic media, a read head for reading information from the magnetic media, and an electrical circuit element that is disposed proximate the read head that functions to generate an electromagnetic field at the read head that is generally oppositely directed to the electromagnetic field generated by the write head. The method for operating the read/write head in a hard disk drive, includes the steps of writing data onto a hard disk, while simultaneously generating an electromagnetic field at the read head that is directed oppositely to the electromagnetic field generated by the write head.

39 Claims, 13 Drawing Sheets

MAGNETIC READ/WRITE HEAD HAVING ELECTROMAGNETIC FIELD CANCELLATION ELEMENT

BACKGROUND OF THE INVENTION

1. Field of the Invention

The present invention relates generally to read/write magnetic head assemblies, and more particularly to devices for canceling unwanted electromagnetic fields within such heads.

2. Description of the Prior Art

In a conventional hard-disk drive (HDD) utilizing so-called MR heads as the recording transducer, the recording head typically uses different elements on the head to perform the write and read operations. Writing on the hard-disk is typically performed using an inductive writing head element, and reading back from the hard-disk is typically performed using a read head having a magnetoresistive (MR) element. The inductive write head and the MR element are specially-made structures on the read/write head consisting of layers of specially-deposited thin films. The read head is typically deposited onto the substrate first, and the write head layers are deposited after the deposition of the read head. In other prior art devices the write head layers are deposited first and the read head is deposited after them. In either head configuration significant problems occur because the electromagnetic field generated by the write head can adversely affect the operation of the read head by biasing the MR element. Where the MR element has become biased by exposure to the electromagnetic field of the write head, it produces a noisy signal that ultimately leads to reading errors. A need therefore exists for an improved read/write head wherein the MR element is not exposed to strong electromagnetic fields from the write head. The present invention solves this problem by creating an oppositely directed electromagnetic field at the MR which acts to substantially interfere with and cancel the effects of the electromagnetic field generated by the write head.

SUMMARY OF THE INVENTION

The present invention is a read/write head for writing information to magnetic media and reading information from magnetic media. It includes a write head for writing information onto magnetic media, a read head for reading information from the magnetic media, and an electrical circuit element that is disposed proximate the read head that functions to generate an electromagnetic field at the read head that is generally oppositely directed to the electromagnetic field generated by the write head. The method for operating the read/write head in a hard disk drive, includes the steps of writing data onto a hard disk, while simultaneously generating an electromagnetic field at the read head that is directed oppositely to the electromagnetic field generated by the write head.

It is an advantage of the read/write head of the present invention that electromagnetic field biasing of the read head is reduced.

It is a further advantage of the present invention that an electromagnetic field generating electrical circuit element is disposed proximate the read head to generate an electromagnetic field that substantially interferes with and cancels the electromagnetic field from the write head.

It is yet another advantage of the present invention that an improved read/write head has been developed which utilizes existing manufacturing technology.

It is yet another advantage of the present invention that an improved slider having the improved read/write head disposed thereon, and an improved hard disk drive incorporating the improved slider are made possible through the utilization of the present invention.

These and other features and advantages of the present invention will become fully understood upon reading the following detailed description of the preferred embodiments which makes reference to the several figures of the drawings.

IN THE DRAWINGS

DETAILED DESCRIPTION OF THE PREFERRED EMBODIMENTS

In this application, a magnetic recording head with novel, advantageous structural features is described. The magnetic recording head includes both a write head and a read head, and it also includes an electrical circuit element. It is known that the operation of a write head can adversely affect a read head disposed proximate thereto, where the electromagnetic field from the write head biases the read head. The biasing interferes with the operation of the read head and causes a noisy output from the read head. In the present invention the electrical circuit element generates an electromagnetic field at the read head which is generally oppositely directed to the electromagnetic field generated by the write head. Therefore, the electromagnetic field generated by the electrical circuit element acts to interfere with and cancel the effects of the electromagnetic field generated by the write head. In manufacturing one embodiment of the present invention, the electrical circuit element can be deposited on top of the read head after the read head deposition is finished. When the writing current is also passed through the electrical circuit element, the net electromagnetic field generated by both the write head and the electrical circuit element is significantly reduced at the read head. The inductive write head structure and the read head structure, as well as the manufacturing processes of these two structures is similar to the conventional manufacturing processes for read/write heads. The detailed features of the invention are next discussed.

Figure 1:
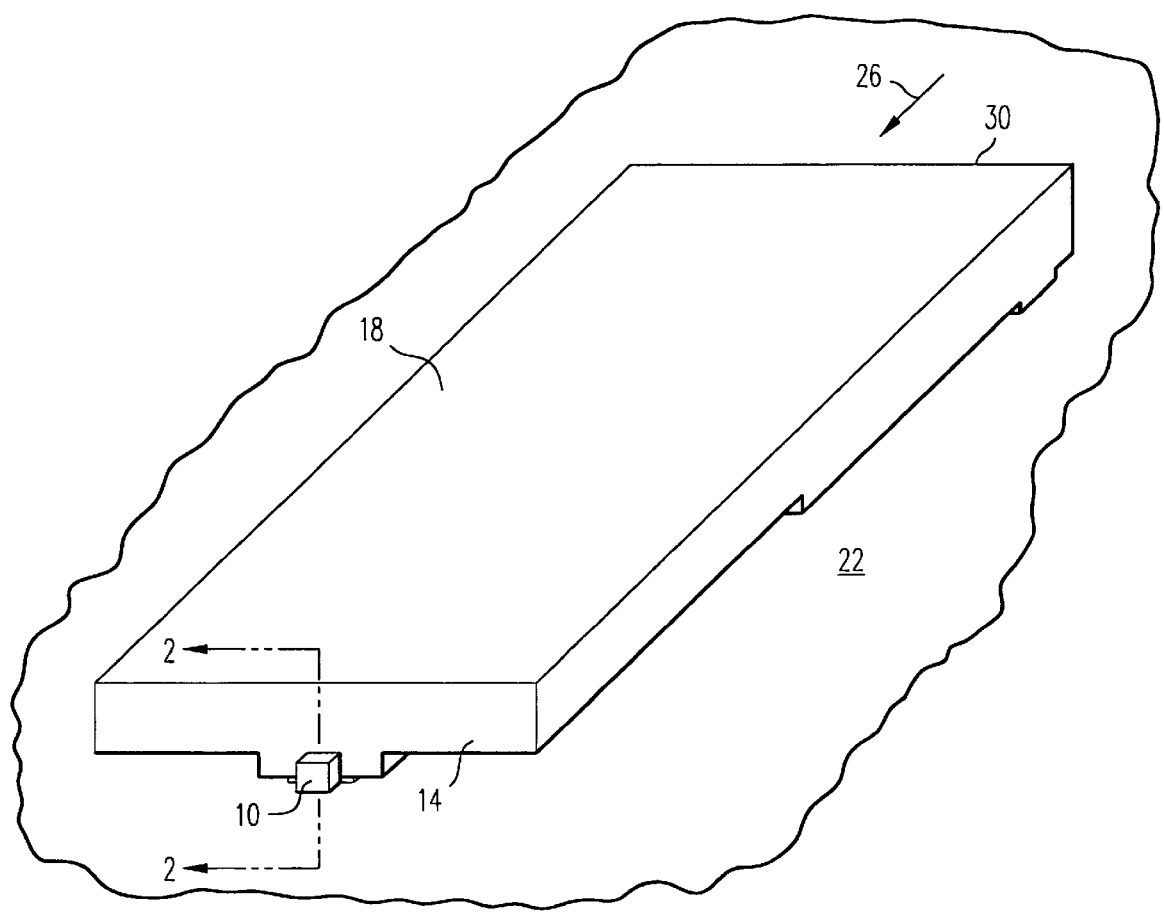
FIG. 1 is a perspective view of a typical hard disk drive slider having a read/write head of the present invention disposed on a rearward surface thereof.

As depicted in FIG. 1, a read/write head 10 of the present invention is disposed on the rearward surface 14 of a typical slider 18. As is known in the prior art, such sliders 18 are designed to fly above the surface of a hard disk 22 which rotates in the direction of arrow 26 from the leading surface 30 of the slider 18 towards the rearward surface 14. The novel features of the various preferred embodiments of the read/write head 10 of the present invention are best understood in conjunction with FIGS. 2 and 3 as are next discussed.

Figure 2:
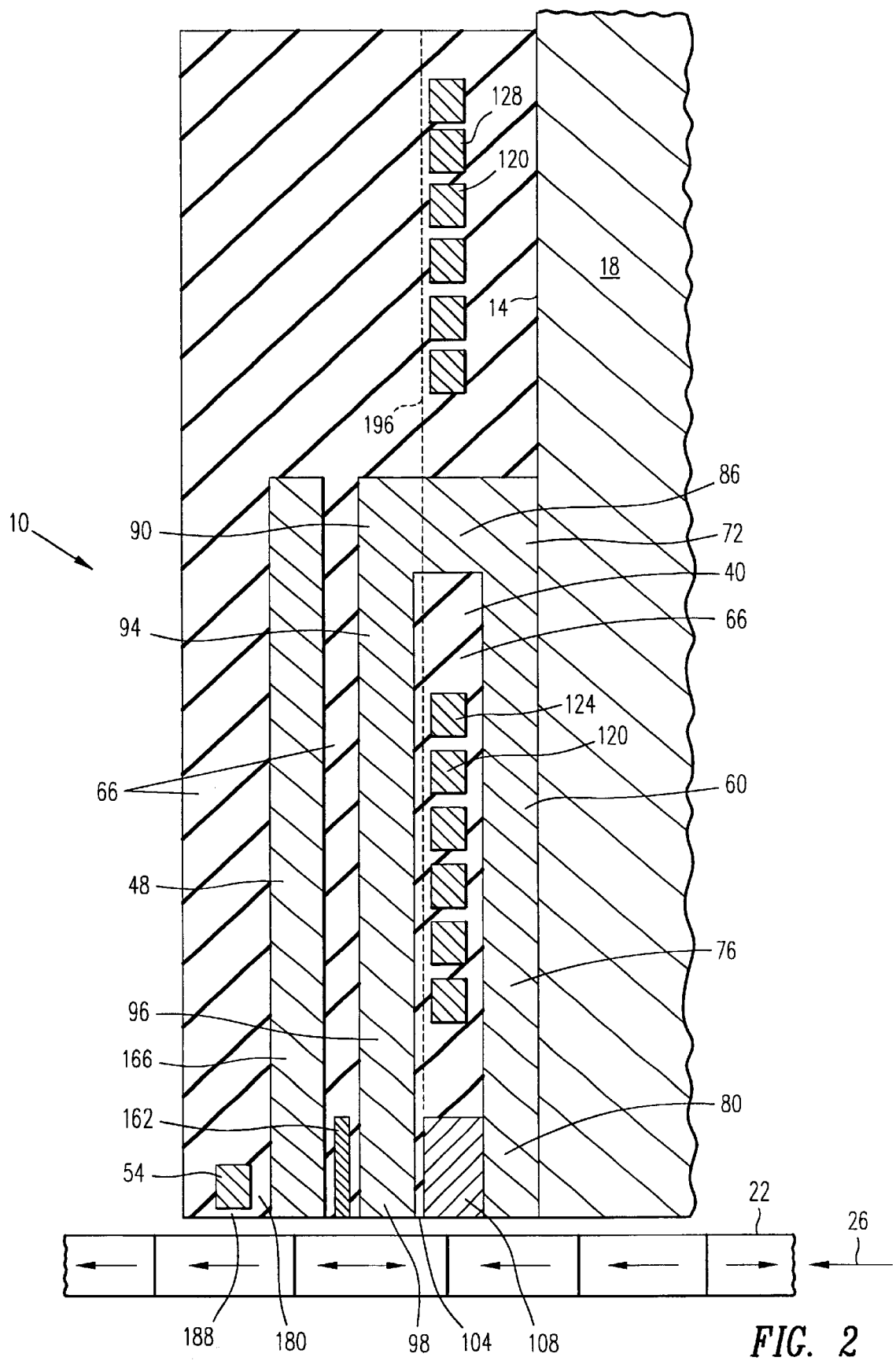
FIG. 2 is a cross-sectional view of a first embodiment of a read/write head of the present invention, taken along lines 2—2 of FIG. 1.
Figure 3:
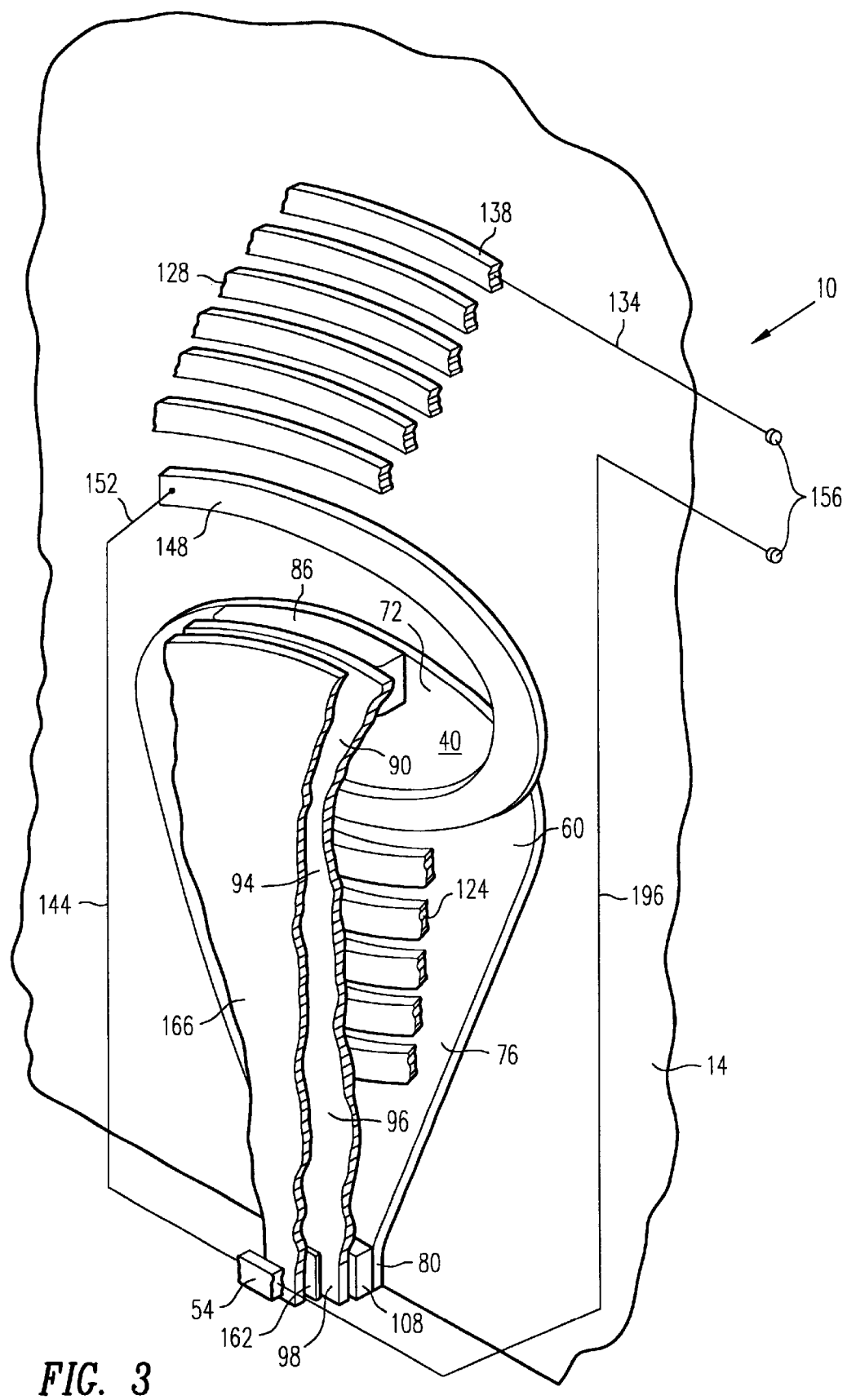
FIG. 3 is a perspective view of the read/write head depicted in FIG. 2 with further cut-away portions to better depict the invention.

FIG. 2 is a side cross-sectional view of a first preferred embodiment of a read/write head taken along lines 2—2 of FIG. 1 and FIG. 3 is a perspective view of the read/write head 10 having cut away portions to better depict the components of the present invention. As depicted in FIGS. 2 and 3, the read/write head 10 generally includes an inductive write head 40 that is formed on the rearward surface 14 of the slider 18, a magnetoresistive (MR) read head 48 that is formed on the outward side of the write head 40, and an electrical circuit element 54 disposed on the outward side of the MR head 48. Each of the elements is next discussed in detail.

The write head 40 includes a first pole 60 piece that is formed on the rearward surface 14 of the slider 18. The various elements of the read/write head 10 are manufactured utilizing thin film deposition techniques that are well known in the semiconductor processing industry, and insulator material 66 is deposited between the various active components of the write head 40, read head 48, and electrical circuit element 54 as is known to those skilled in the art. The first pole piece 60 of the inductive write head 40 is formed with an enlarged upper section 72 which tapers to a narrow lower section 76 and terminates at its lower end in a pole tip 80. A pole piece connector element 86 joins the upper end 72 of the first pole piece 60 to the upper end 90 of a second pole piece 94. The second pole piece 94 is generally formed with the same shape as the first pole piece 60; that is, it has an enlarged upper end 90 and a narrowed lower end 96 which terminates in a narrow pole tip 98 having a width 100. The width 100 of the second pole tip 98 need not be the same as the width of the first pole tip 80. A writing gap 104 is formed between the lower ends 80 and 98 of the first and second pole pieces respectively by a gap forming piece 108 formed on the first pole piece 60. The width of the data writing track is determined by the width (W) of the gap forming piece 108.

An induction coil 120 is utilized to create the magnetic field that is focused by the pole pieces 60 and 94. The induction coil 120 has a generally spiral shape and is formed with lower turn portions 124 that pass between the pole pieces 60 and 94, and upper turn portions 128 that pass outside of the pole pieces 60 and 94. To provide electrical power to the induction coil 120, a first electrical lead 134 is engaged to an outer end 138 of the coil 120 and a second electrical lead 144 is engaged to an inner end 148 of the induction coil 120. The thin film deposition processing techniques that form the lead 144 may include the formation of vias 152 to direct the lead 144 out of the plane of the induction coil 120 and ultimately to the external electrical connection terminals 156.

Following the formation of the second pole piece 96 the components of the read head 48 are next deposited; the components thereof are known to those skilled in the art. Basically, the read head 48 includes a magnetoresistive (MR) element 162 formed behind the second pole piece 96 which functions as a first magnetic shield element of the read head 48, and a second magnetic shield element 166 disposed thereafter. The width of the MR element 162 is preferably less than the width (W) of the gap forming piece 108 of the write head 40, such that the read head 48 will be disposed above the same disk track that the write head 40 is on, even when the read/write head 10 is disposed at a maximum skew angle relative to the track direction, as will be understood by those skilled in the art. In the preferred embodiment, the width of the MR element 162 is from approximately the width (W) of the gap forming piece 108 of the write head to 1/10 of the width (W) of the gap forming piece.

An electrical circuit element 54, in the form of a conductive line 54 in this embodiment 10, is next disposed behind the read head 48 to provide an electromagnetic field which interferes with and acts to reduce and cancel the electromagnetic field at the read head MR element 162 that is caused by the write head 40. The conductive line 54 is deposited behind the read head 48 such that a layer of insulation 180 separates the conductive line 54 from the second shield 166 of the read head 48, and a sufficient thickness of insulator material 188 may be disposed beneath the conductive line 54 to prevent corrosion problems, particularly where the conductive line 54 is composed of copper.

Electrical power for the conductive line 54 is preferably provided through the induction coil circuitry. That is, the electrical line 144 from the inner end 148 of the induction coil is routed in series to and through the conductive line 54. Particularly, the electrical lead 144 is fed through vias 152 and outwardly to the substrate layer that includes the conductive line 54. The electrical lead 144 passes through the line 54 and thence inwardly through a via 192 and upwardly 196 to its outer terminal connection 156. An important feature of the device 10 is that no new electrical connections or additional read/write head terminals are required to obtain the performance enhancement provided by the conductive line 54. This is because the electrical lead 144 of the induction coil 120 is routed through the line 54 and thence to the terminal 156.

It is therefore to be understood that the electrical current that passes through the induction coil 120 to create the electromagnetic field for the write head, also passes through the conductive line 54, such that it creates a small electromagnetic field by its passage through the line 54. Furthermore, as will be understood by those skilled in the art, owing to the direction of the electrical current through the conductive line 54, the electromagnetic field generated by the conductive line 54 at the MR element 162 is directed oppositely to the electromagnetic field that is generated by the write head 40. That is, with specific regard to the location of the MR element 162, where the write head 40 (according to the right hand rule) creates a generally downward electromagnetic field at the MR element 162, the conductive line 54 creates a generally upward electromagnetic field; whereby the electromagnetic field of the conductive line 54 acts to interfere with and cancel the effects of the electromagnetic field generated by the write head 40. Thus, the conductive line 54 generates an interfering electromagnetic field that acts to cancel the effect of the write head electromagnetic field upon the MR element 162. The conductive line 54 in the read/write head embodiment 10 therefore acts to eliminate the biasing effect of the write head upon the read head.

As indicated hereabove, the manufacturing process for the device 10 involves thin film processing techniques that are known to those skilled in the art. Of particular concern to the creation of an operable device is that the elements of the read head 48 be deposited flat and parallel to each other. To achieve this, the manufacturing method of the present invention preferably includes at least one planarization step. Particularly, as depicted in FIG. 2, a planarization layer 196 (shown in phantom) may be formed subsequent to the deposition of the induction coil 120 and the pole tip piece 108. Processes such as chemical-mechanical polishing are utilized to form the planarization layer 196.

Figure 4:
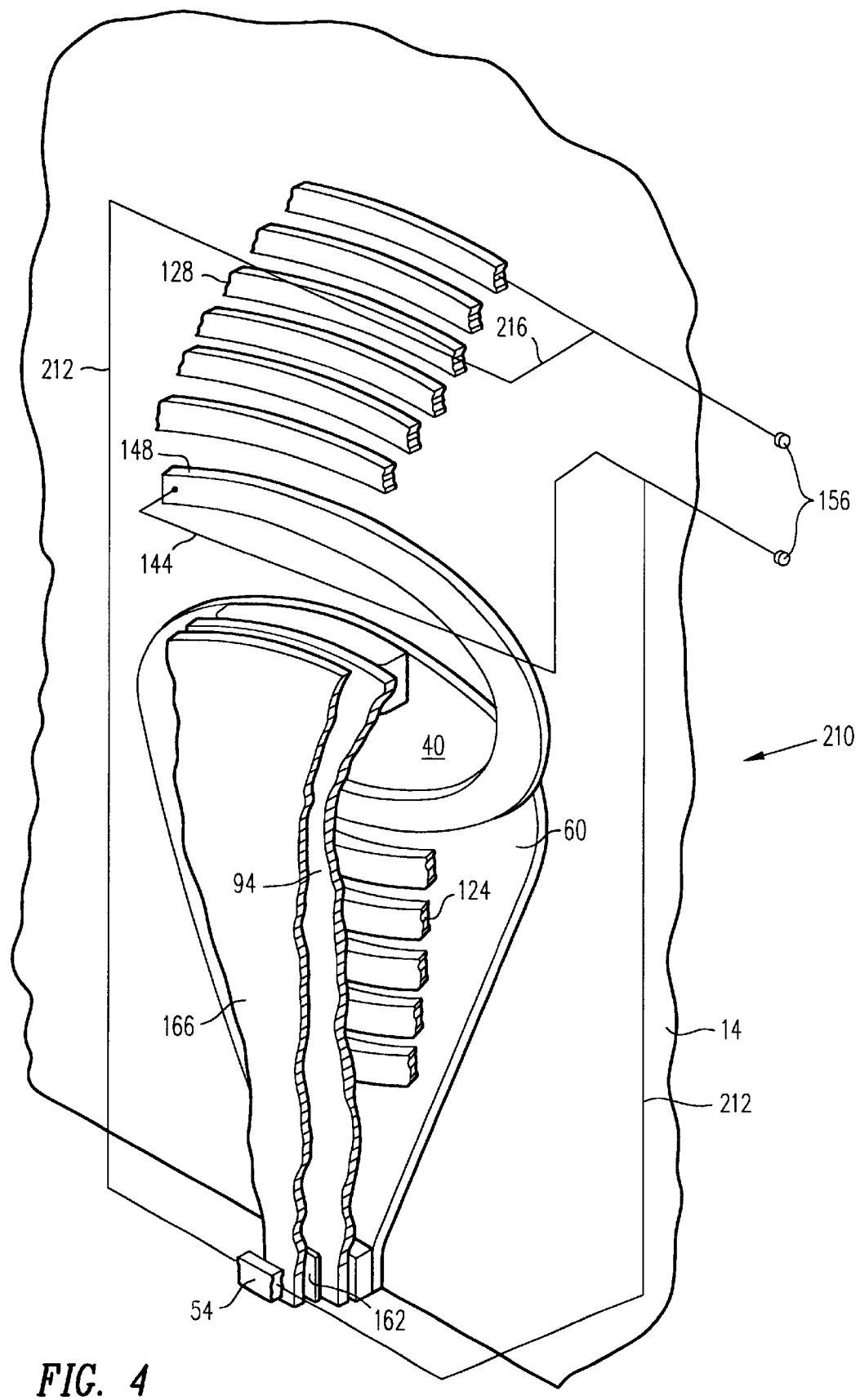
FIG. 4 is a perspective view of an alternative embodiment of the read/write head depicted in FIG. 2 with cut-away portions to better depict the invention.

A first alternative embodiment 210 to the embodiment 10 discussed hereabove is depicted in FIG. 4, which is a perspective view similar to FIG. 3. In comparing the embodiment depicted in FIG. 4 with embodiment 10 depicted in FIG. 3, it is to be understood that the significant difference between embodiments 210 and 10 is the electrical interconnection of the conductive line 54. Specifically, the conductive line 54 of embodiment 210 is electrically connected in parallel with the circuitry of the induction coil 120; whereas, in the embodiment 10 the conductive line 54 is electrically connected in series with the electrical circuit of the induction coil 120. Particularly, an electrical circuit 212 is formed through vias 216 and 220 in the deposited layers of the device 210 to electrically connect the conductive line 54 with the terminals 156 of the device 210. The electrical lead 144 from the inner end 148 of the induction coil 120 is likewise fed to the device terminal 156. As will be understood by those skilled in the art, it may be necessary to provide an impedance matching component (not shown) within the electrical circuitry 212 of the conductive line 54 to match the impedance of the induction coil 120. It is to be understood that other components and elements of the embodiment 210 are structurally identical to those of embodiment 10 as described hereabove.

Figure 5:
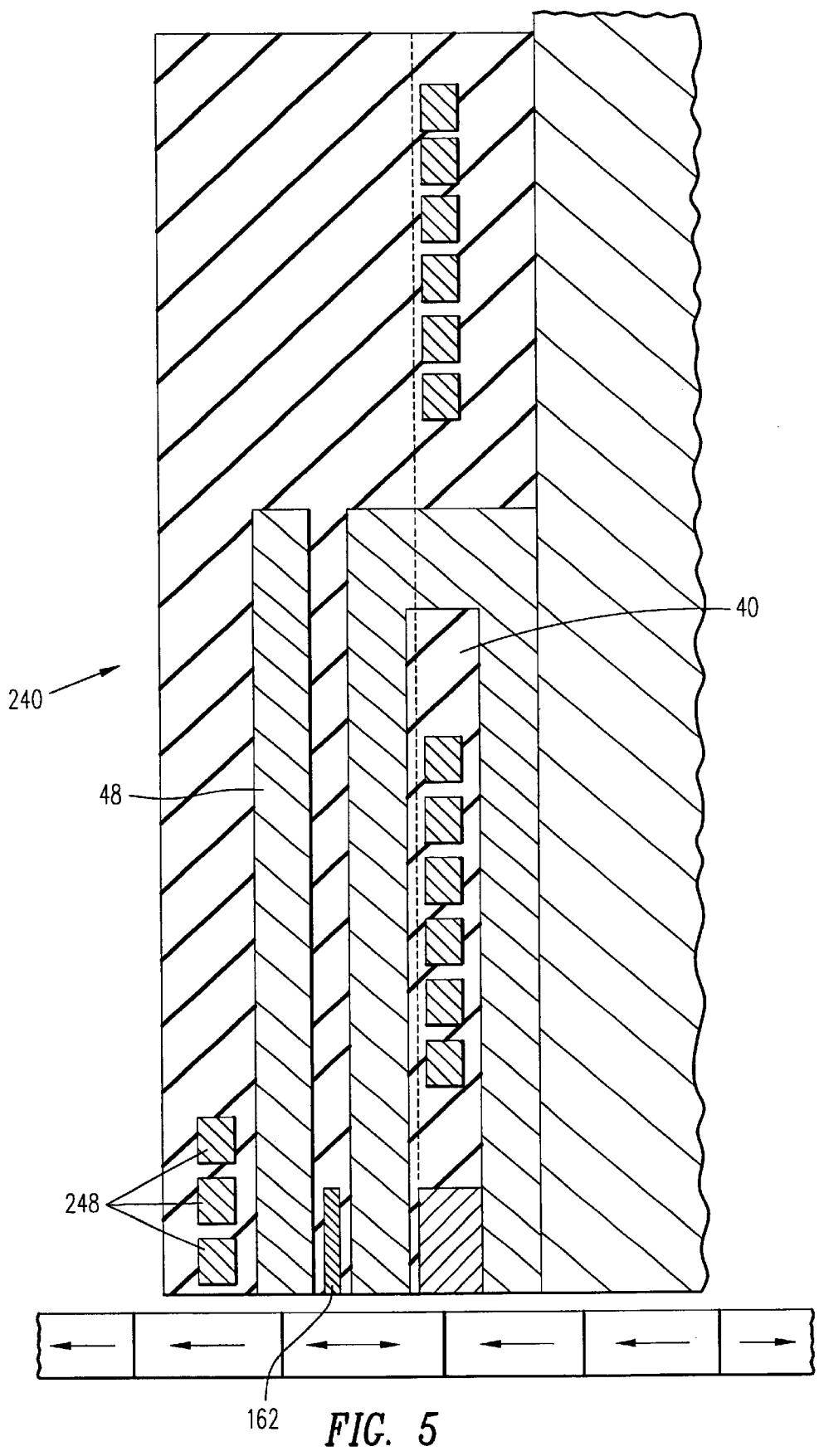
FIG. 5 is a side cross-sectional view of a second embodiment of a read/write head of the present invention that is similar to the view depicted in FIG. 2.
Figure 6:
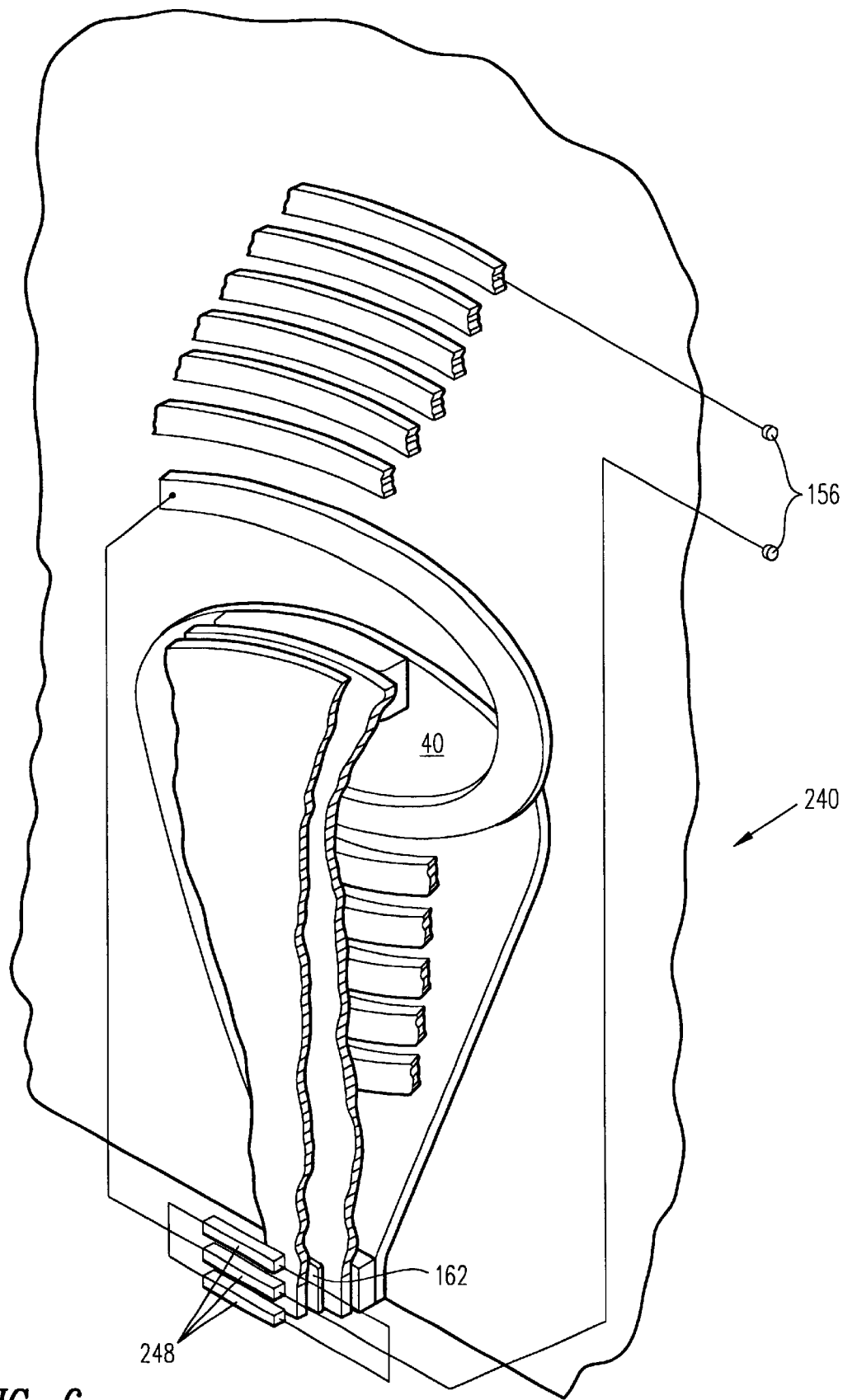
FIG. 6 is a perspective view of the read/write head depicted in FIG. 5 having further cut-away portions to better depict the invention, and being similar to the view depicted in FIG. 3.

Another embodiment 240 of the present invention is depicted in FIGS. 5 and 6, wherein FIG. 5 is a side cross-sectional view, similar to FIG. 2, and FIG. 6 is a perspective view, similar to FIG. 3. The significant difference between embodiment 240 and embodiment 10 is that an electrical circuit element in the form of three generally parallel conductive lines 248 are utilized in embodiment 240 in place of the single electrical circuit conductive line 54 of embodiment 10. The three conductive lines 248 are electrically connected in parallel, relative to each other, and they provide a differently shaped electromagnetic field than the single conductive line 54 of embodiment 10. However, the electromagnetic field created by the three conductive lines 248 is still directed oppositely to the electromagnetic field at the MR element 162 that is generated by the write head 40. That is, with specific regard to the location of the MR element 162, where the write head 40 (according to the right hand rule) creates a generally downward electromagnetic field at the MR element 162, the three conductive lines 248 create a combined generally upward electromagnetic field; whereby the electromagnetic field of the conductive lines 248 acts to interfere with and cancel the effects of the electromagnetic field generated by the write head 40. Thus, as with embodiment 10, the conductive lines 248 generate an interfering electromagnetic field that acts to cancel the biasing effect of the write head electromagnetic field upon the MR element 162. Additionally, and alternatively, it is to be understood that while the three conductive lines 248 are electrically interconnected in series with the induction coil 120, as is the single conductive line 54 of embodiment 10, depicted and described hereabove, it is to be understood that the three conductive lines 248 can be electrically interconnected in parallel with the induction coil 120, as is done in embodiment 210, depicted in FIG. 4 and described hereabove.

Figure 7:
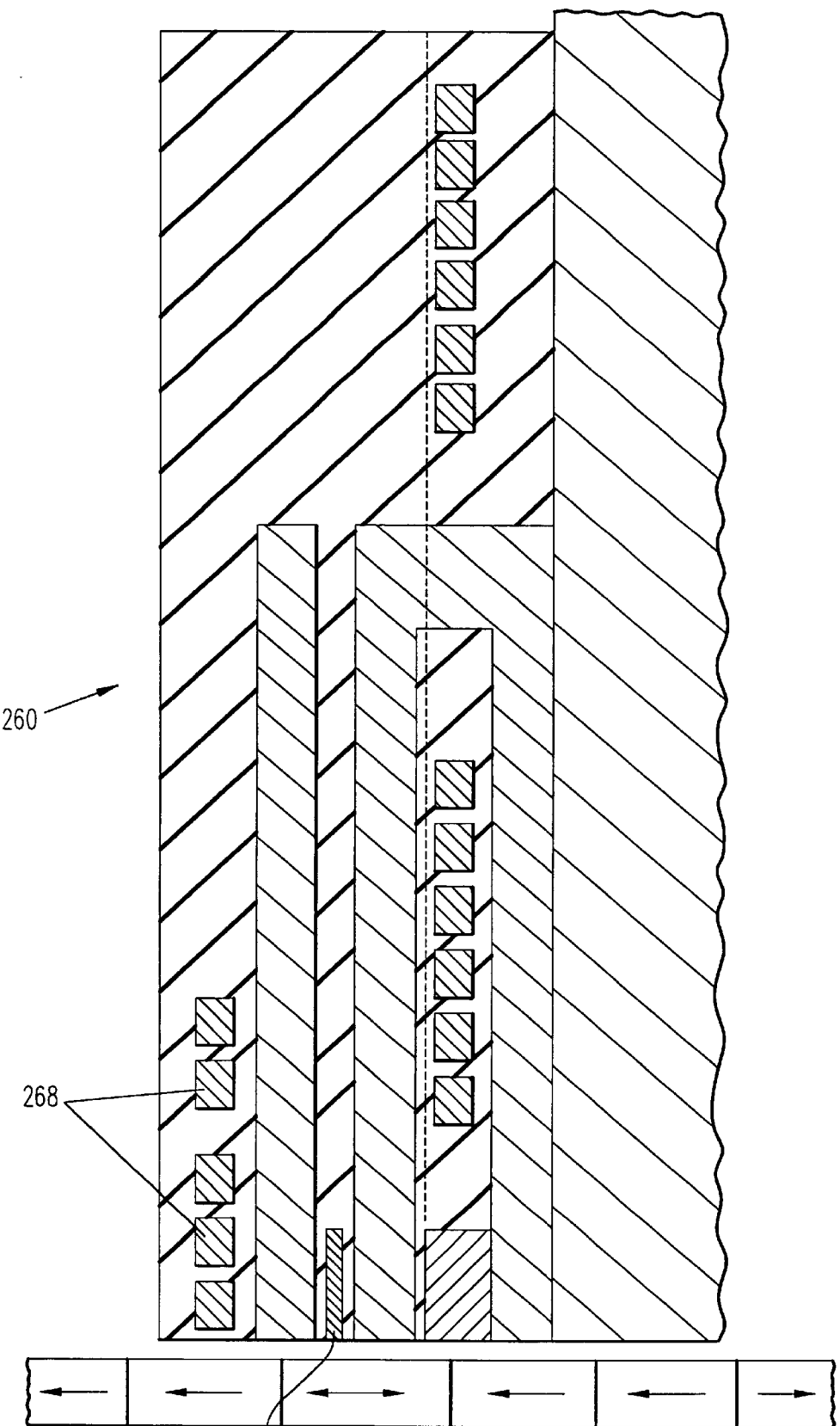
FIG. 7 is a side cross-sectional view of a further embodiment of a read/write head of the present invention that is similar to the view depicted in FIG. 2.
Figure 8:
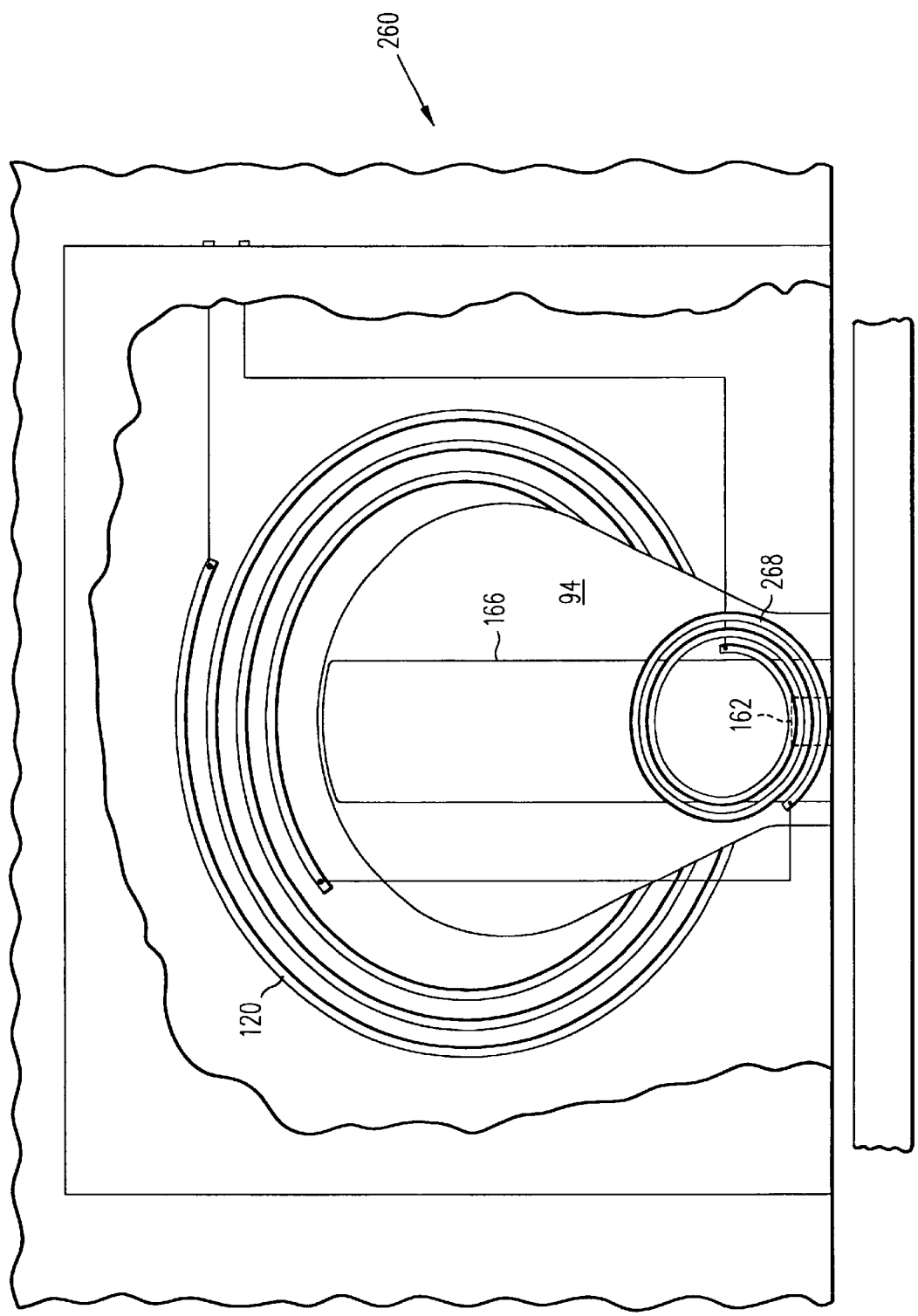
FIG. 8 is a rear elevational view of the read/write head depicted in FIG. 7 having cut-away portions to better depict the invention.
Figure 9:
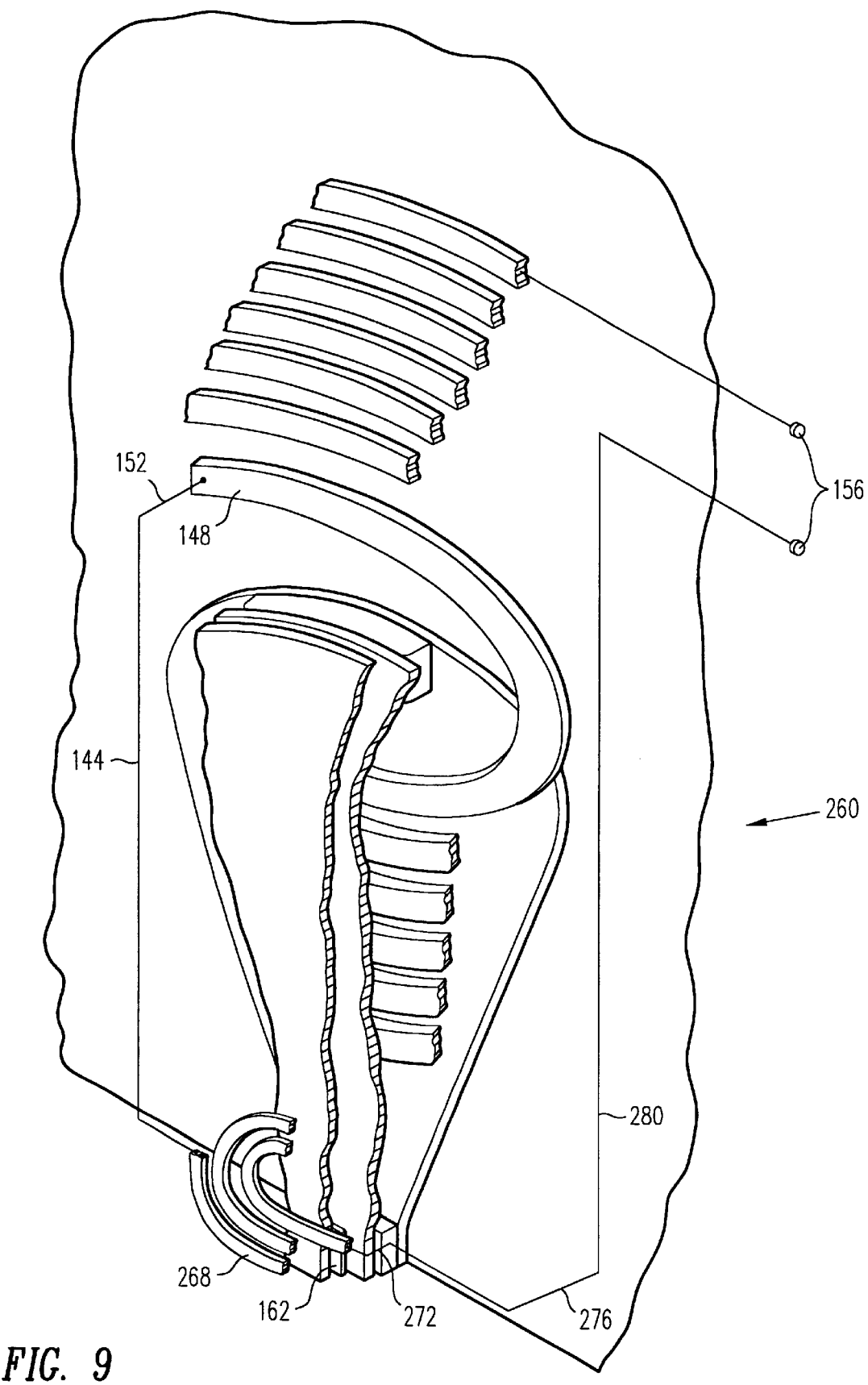
FIG. 9 is a perspective view of the read/write head depicted in FIGS. 7 and 8 having further cutaway portions to better depict the invention, and being similar to the view depicted in FIG. 3.

Yet another embodiment 260 of the present invention is depicted in FIGS. 7, 8 and 9, wherein FIG. 7 is a side cross-sectional view, similar to FIG. 2, FIG. 8 is a rear elevational view with cutaway portions, and FIG. 9 is a perspective view similar to FIG. 3. The significant difference between embodiment 260 and the preceding embodiments 10 and 240 is that the electrical circuit element 54 and 248 respectively is replaced with an electrical circuit element shaped in a coil configuration 268. Particularly, as depicted in FIGS. 7–9, the electrical circuit element 268 is formed as a generally flat spiral, similar to the induction coil 120 but smaller in size. The circuit element 268 is electrically interconnected within the device 260, such that the electromagnetic field generated by the circuit element 268 at the MR element 162 is directed oppositely to the electromagnetic field that is generated by the write head 40. That is, with specific regard to the location of the MR element 162, where the write head 40 (according to the right hand rule) generates a generally downward electromagnetic field at the MR element 162, the circuit element 268 creates a generally upward magnetic field at the MR element, whereby the electromagnetic field of the circuit element 268 acts to interfere with and cancel the effects of the electromagnetic field generated by the write head 40. Thus, the circuit element 268 generates an interfering electromagnetic field that acts to cancel the biasing effect of the write head electromagnetic field upon the MR element 162. It is to be noted that the electrical circuit element 268 is electrically interconnected in series with the induction coil 120. That is, the electrical line 144 from the inner end 148 of the induction coil 120 is routed in series to and through the electrical circuit element 268. Particularly, the electrical lead 144 is fed through a via 152 and outwardly to the substrate layer that includes the electrical circuit element 268. The electrical lead 144 passes through the electrical circuit element 268 and thence inwardly through vias 272 and 276, and upwardly 280 to the outer terminal connection 156.

Figure 10:
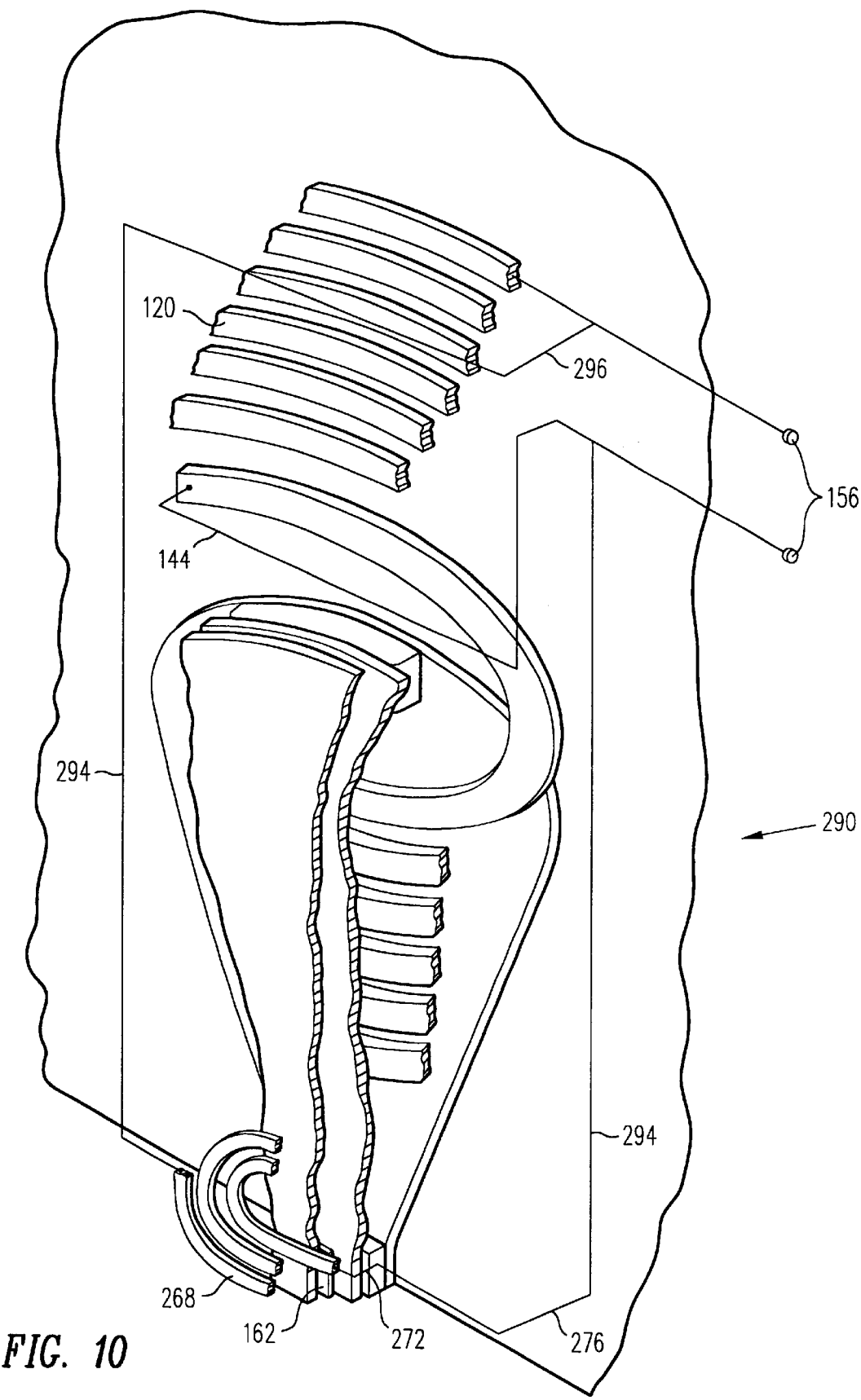
FIG. 10 is a perspective view of an alternative embodiment of the read/write head depicted in FIG. 7 having cut-away portions and being similar to the view depicted in FIG. 9.

Yet a further embodiment 290 of the present invention is depicted in FIG. 10 which is a perspective view similar to FIG. 9. As will be understood by those skilled in the art, the significant difference between embodiment 290 and embodiment 260 is that the electrical circuit element 268 of embodiment 290 is electrically interconnected in parallel with the induction coil 120; whereas the electrical circuit element 268 of embodiment 260 is electrically interconnected in series. Specifically, the electrical circuitry 294 passes through vias 296 to the substrate layer that includes the electrical circuit element 268 and through vias 272 and 276 to the outer terminal connection 156. As with previously described electrically parallel interconnections, it may be necessary to include impedance matching elements within the electrical circuit 294.

Figure 11:
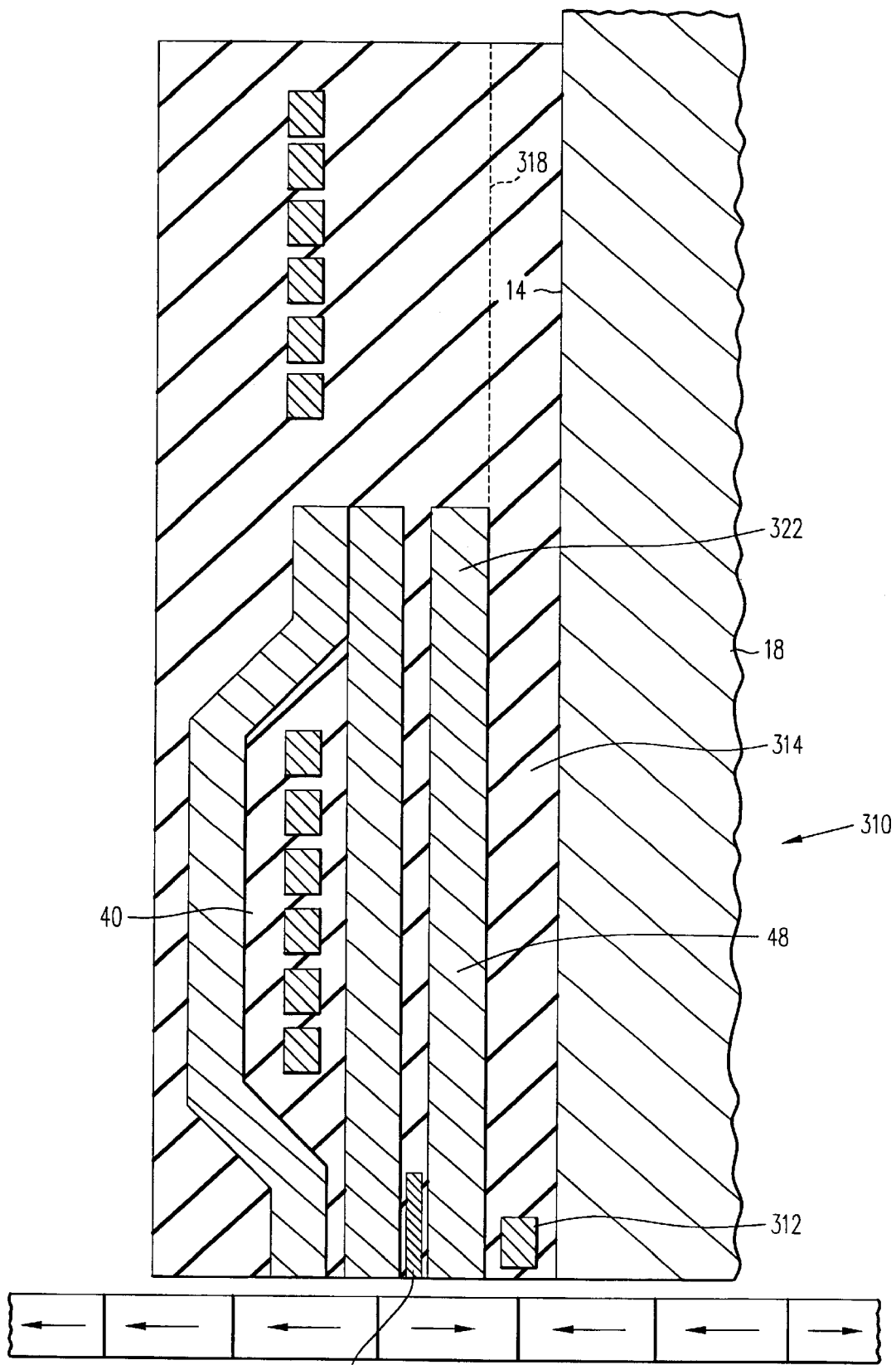
FIG. 11 is a side cross-sectional view of a further embodiment of a read/write head of the present invention that is similar to the view depicted in FIG. 2.

A further embodiment 310 of the present invention is depicted in FIG. 11, which is a side cross-sectional view, similar to FIG. 2. The significant difference between embodiment 310 depicted in FIG. 11 and embodiment 10 depicted in FIG. 2, is that the location of the read head 48 and the write head 40 is reversed, and the electrical circuit element 312 is disposed inwardly of the read head 48, but still on the opposite side of the read head 48 relative to the write head 40.

Specifically, as depicted in FIG. 11, the electrical circuit element comprises a conductive line 312 that is first deposited upon the flat rear surface 14 of the slider 18, and insulator material 314 is deposited to electrically insulate the conductive line 312. Thereafter, a planarized surface 318 (shown in phantom) is preferably formed prior to the deposition of a first read head magnetic shield piece 322, such that a flat deposition surface for the shield 322 is created. Following the deposition of the first read head shield 322, the further components of the read head 48 and write head 40 are deposited utilizing well known semiconductor processing techniques. As with the previously described preferred embodiment 10, the conductive line 312 is electrically interconnected within the device 310, such that the direction of the electrical current through the conductive line 312 creates an electromagnetic field at the MR element 162 that is directed oppositely to the electromagnetic field that is generated by the write head 40. That is, with specific regard to the location of the MR element 162, where the write head 40 (according to the right hand rule) creates a generally downward electromagnetic field at the MR element 162, the conductive line 312 creates a generally upward electromagnetic field; whereby the electromagnetic field of the conductive line 312 acts to interfere with and cancel the effects of the electromagnetic field generated by the write head 40. Thus, the conductive line 312 generates an interfering electromagnetic field that acts to cancel the biasing effect of the write head electromagnetic field upon the MR element 162. It is to be understood, with consideration of the preferred embodiments 10 and 210 depicted and described hereabove, that the conductive line 312 is substantially identical to the conductive line 54, and it can be electrically interconnected in series or in parallel with the induction coil of the write head 40.

Figure 12:
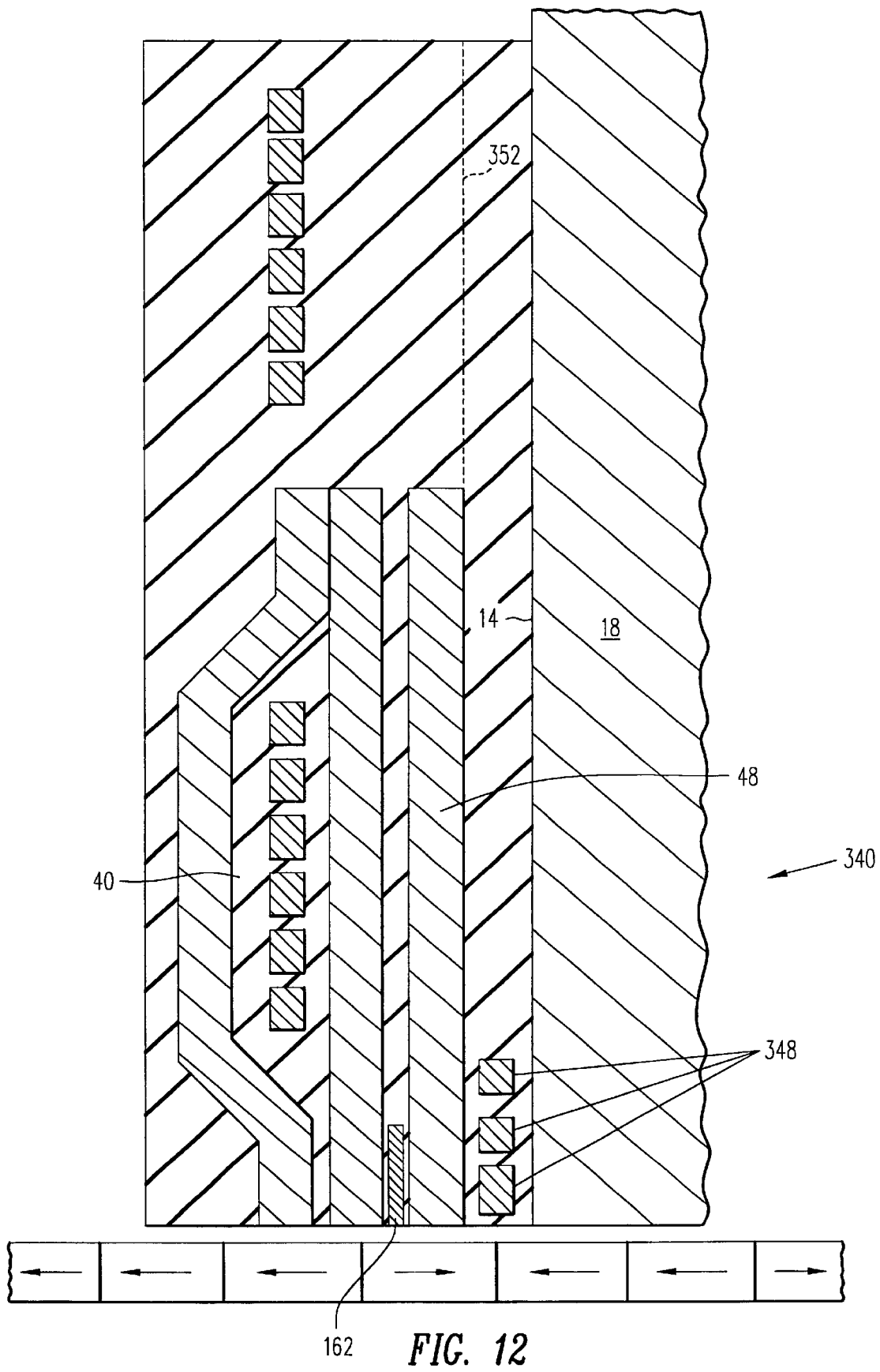
FIG. 12 is a side cross-sectional view of yet another embodiment of a read/write head of the present invention that is similar to the view depicted in FIG. 1.

Still a further embodiment 340 of the present invention is depicted in FIG. 12, which is a side cross-sectional view similar to FIGS. 5 and 11. The significant difference between embodiment 340 and embodiment 310 is that the conductive line 312 of embodiment 310 is replaced with an electrical circuit element comprising three conductive lines 348. In this regard, embodiment 340 is similar to embodiment 310 in the same way that embodiment 240 is similar to embodiment 10. Specifically, the three conductive lines 348 are deposited in a first layer upon the surface 14 of the slider 18. Thereafter, a planarized surface 352 (shown in phantom) is created and the read head 48 followed by the write head 40 are formed thereon. As will be understood by those skilled in the art upon having read and understood the description of embodiment 240 set forth hereabove, the three conductive lines 348 may be electrically interconnected with the induction coil 120 of the write head 40 in series or in parallel. The significant feature of the electrical interconnection of the three conductive lines 348 is that the direction of the electrical current through the conductive lines 348 must be such that the electromagnetic field generated by the conductive lines 348 at the MR element 162 is directed oppositely to the electromagnetic field generated by the write head 40. Thus, the conductive lines 348 generate an interfering electromagnetic field that acts to cancel the biasing effect of the write head electromagnetic field upon the MR element 162.

Figure 13:
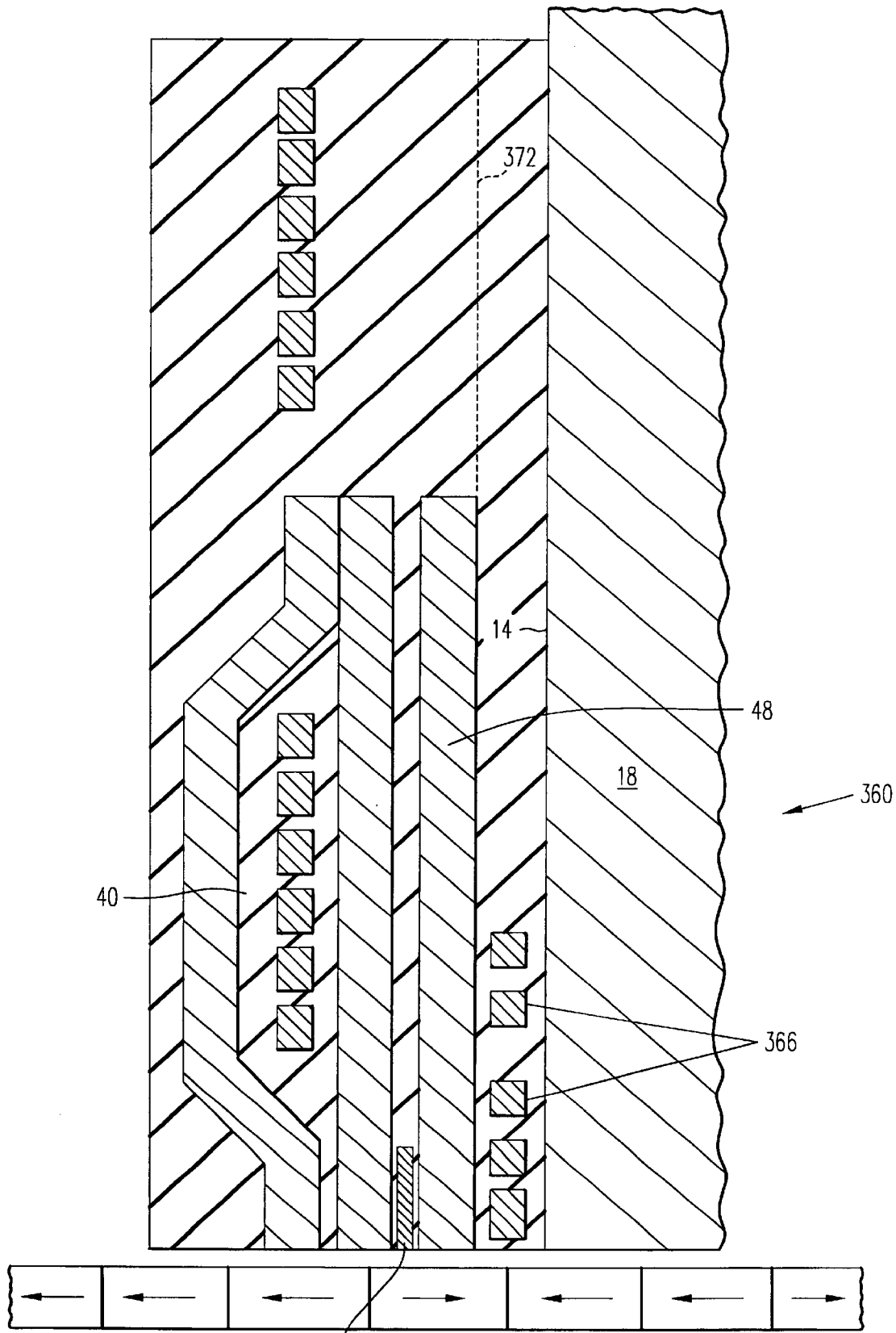
FIG. 13 is a side cross-sectional view of yet a further embodiment of a read/write head of the present invention that is similar to the view depicted in FIG. 12.

Still a further embodiment 360 of the present invention is depicted in FIG. 13, which is a side cross-sectional view that is similar to FIGS. 12 and 7 depicted and described hereabove. The significant difference between embodiment 360 depicted in FIG. 13 and embodiment 340 depicted in FIG. 12 is that embodiment 360 includes a generally spiral electrical circuit element 366 that is similar to the spiral electrical circuit element 268 depicted in FIGS. 7, 8 and 9 and described in detail hereabove. Specifically, electrical circuit element 366 is formed as a flat spiral element, generally similar to spiral element 268, and is formed on the outer surface 14 of the slider body 18. A planarized surface 372 (shown in phantom) is preferably formed thereafter, and the read head 48, followed by the write head 40 are thereafter deposited to form the embodiment 360. As with the circuit element 268 of embodiment 260, it is important that the direction of the electrical current through the circuit element 366 be directed such that the electromagnetic field generated by the circuit element 366 at the MR element 162 is directed oppositely to the electromagnetic field that is generated by the write head 40; whereby the electromagnetic field of the circuit element 366 acts to interfere with and cancel the biasing effects of the electromagnetic field generated by the write head 40. It is to be further understood that the electrical circuit element 366 may be electrically connected in the device 360 in series with the induction coil of the write head 40 or in parallel therewith.

While the present invention has been shown and described with regard to certain preferred embodiments, it will be understood by those skilled in the art upon comprehending the preceding disclosure that certain alterations and modifications in form and detail may be made therein. It is therefore intended by the inventors that the following claims cover all such alterations and modifications that nevertheless include the true sprit and scope of the invention.

We claim:

1. A read/write head for writing information to magnetic media and reading information from said magnetic media, comprising:

a write head for writing information onto said magnetic media, said write head including an induction coil;

a read head for reading information from said magnetic media;

an electrical circuit element being disposed proximate said read head and functioning to generate an electromagnetic field at said read head that is generally oppositely directed to an electromagnetic field generated by said write head at said read head; and wherein said write head is disposed on one side of said read head and said electrical circuit element is disposed on another side of said read head, such that said read head is disposed between said write head and said electrical circuit element.

2. A read/write head as described in claim 1 wherein said electrical circuit element includes at least one electrical circuit conductive line through which electrical current passes.

3. A read/write head as described in claim 2 wherein said electrical current also passes through said induction coil of said write head.

4. A read/write head for writing information to magnetic media and reading information from said magnetic media, comprising:

a write head for writing information onto said magnetic media, said write head including an induction coil;

a read head for reading information from said magnetic media;

an electrical circuit element being disposed proximate said read head and functioning to generate an electromagnetic field at said read head that generally interferes with and cancels an electromagnetic field generated by said write head at said read head; and wherein said write head is disposed on one side of said read head and said electrical circuit element is disposed on another side of said read head, such that said read head is disposed between said write head and said electrical circuit element.

5. A read/write head as described in claim 4 wherein said electrical circuit element includes at least one conductive line through which electrical current passes.

6. A read/write head as described in claim 5 wherein said electrical current also passes through said induction coil of said write head.

7. A read/write head as described in claim 4 wherein said electrical circuit element is electrically connected in series with respect to electrical current passing through said induction coil of said write head.

8. A read/write head as described in claim 4 wherein said electrical circuit element is electrically connected in parallel with respect to electrical current passing through said induction coil of said write head.

9. A read/write head as described in claim 4 wherein said electrical circuit element includes a plurality of conductive lines through which electrical current passes.

10. A read/write head as described in claim 4 wherein said electrical circuit element is formed in a coil configuration through which electrical current passes.

11. A slider device for a hard disk drive comprising:

a slider body being adapted to fly over the surface of a hard disk;

a read/write head being formed on a surface of said slider body, said read/write head including:

a write head for writing information onto magnetic media, said write head including an induction coil;

a read head for reading information from said magnetic media;

an electrical circuit element being disposed proximate said read head and functioning to generate an electromagnetic field at said read head that is generally oppositely directed to an electromagnetic field generated by said write head at said read head; and wherein said write head is disposed on one side of said read head and said electrical circuit element is disposed on another side of said read head, such that said read head is disposed between said write head and said electrical circuit element.

12. A slider device as described in claim 11 wherein said write head is disposed upon said slider body surface, said read head is disposed upon said write head and said electrical circuit element is disposed upon said read head.

13. A slider device as described in claim 12 wherein said electrical circuit element includes at least one conductive line through which electrical current passes.

14. A slider device as described in claim 13 wherein said electrical current also passes through said induction coil of said write head.

15. A slider device as described in claim 12 wherein said electrical circuit element includes a plurality of conductive lines through which electrical current passes.

16. A slider device as described in claim 12 wherein said electrical circuit element is formed in a coil configuration through which electrical current passes.

17. A slider device as described in claim 11 wherein said electrical circuit element is disposed upon said slider body surface, said read head is disposed upon said electrical circuit element and said write head is disposed upon said read head.

18. A slider device as described in claim 17 wherein said electrical circuit element includes at least one conductive line through which electrical current passes.

19. A slider device as described in claim 18 wherein said electrical current also passes through said induction coil of said write head.

20. A slider device as described in claim 17 wherein said electrical circuit element includes a plurality of conductive lines through which electrical current passes.

21. A slider device as described in claim 17 wherein said electrical circuit element is formed in a coil configuration through which electrical current passes.

22. A slider device as described in claim 11 wherein said electrical circuit element is electrically connected in series with respect to electrical current passing through said induction coil of said write head.

23. A slider device as described in claim 11 wherein said electrical circuit element is electrically connected in parallel with respect to electrical current passing through said induction coil of said write head.

24. A hard disk drive, comprising:

at least one hard disk being adapted for rotary motion;

at least one slider device having a slider body portion and being adapted to fly over said hard disk;

a read/write head being formed on a surface of said slider body, said read/write head including:

a write head for writing information onto magnetic media, said write head including an induction coil;

a read head for reading information from said magnetic media;

an electrical circuit element being disposed proximate said read head and functioning to generate an electromagnetic field at said read head that is generally oppositely directed to an electromagnetic field generated by said write head at said read head; and wherein said write head is disposed on one side of said read head and said electrical circuit element is disposed on another side of said read head, such that said read head is disposed between said write head and said electrical circuit element.

25. A hard disk drive as described in claim 24 wherein said write head is disposed upon said slider body surface, said read head is disposed upon said write head and said electrical circuit element is disposed upon said read head.

26. A hard disk drive as described in claim 25 wherein said electrical circuit element includes at least one conductive line through which electrical current passes.

27. A hard disk drive as described in claim 26 wherein said electrical current also passes through said induction coil of said write head.

28. A hard disk drive as described in claim 24 wherein said electrical circuit element is disposed upon said slider body surface, said read head is disposed upon said electrical circuit element and said write head is disposed upon said read head.

29. A hard disk drive as described in claim 28 wherein said electrical circuit element includes at least one conductive line through which electrical current passes.

30. A hard disk drive as described in claim 29 wherein said electrical current also passes through said induction coil of said write head.

31. A method for operating a read/write head of a magnetic media drive, said read/write head including a write head, and a read head and an electrical circuit element, comprising the steps of:

writing data onto magnetic media of a hard disk utilizing said write head;

generating an interference electromagnetic field at said read head, said interference electromagnetic field being generated by said electrical circuit element, where said read head is disposed between said write head and said electrical circuit element;

said interference electromagnetic field being directed oppositely to an electromagnetic field that is generated by said write head at said read head.

32. A method as described in claim 31 wherein said read/write head is disposed upon a hard disk drive slider member, and wherein said write head is disposed upon a surface of said slider member, and said read head is disposed upon said write head, and said electrical circuit element is disposed upon said read head.

33. A method as described in claim 31 including the further step of generating said interference electromagnetic field simultaneously with said step of writing data.

34. A method as described in claim 31 including the further step of providing electrical current to said write head and simultaneously providing electrical current to generate said interference electromagnetic field.

35. A method as described in claim 34 wherein said electrical current that is provided to said write head is also utilized to generate said interference electromagnetic field.

36. A method as described in claim 31 wherein said electrical circuit element includes at least one conductive line through which electrical current passes.

37. A method as described in claim 31 wherein said write head is disposed on one side of said read head and said electrical circuit element is disposed on another side of said read head.

38. A method as described in claim 31 wherein said electrical circuit element includes a plurality of conductive lines through which electrical current passes.

39. A method as described in claim 31 wherein said electrical circuit element is formed in a coil configuration through which electrical current passes.

* * * * *